(12) United States Patent
Ishigami et al.

(10) Patent No.: US 8,254,693 B2
(45) Date of Patent: Aug. 28, 2012

(54) IMAGE PROCESSING APPARATUS, IMAGE PROCESSING METHOD AND PROGRAM

(75) Inventors: Miho Ishigami, Tokyo (JP); Ichiro Umeda, Tokyo (JP); Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/499,954

(22) Filed: Jul. 9, 2009

(65) Prior Publication Data

US 2010/0014752 A1    Jan. 21, 2010

(30) Foreign Application Priority Data

Jul. 18, 2008    (JP) ................................. 2008-187111

(51) Int. Cl.
G06K 9/48    (2006.01)
(52) U.S. Cl. ........................................ 382/199; 382/194
(58) Field of Classification Search .......... 382/190–200, 382/162–168
See application file for complete search history.

(56) References Cited

U.S. PATENT DOCUMENTS

| | | | | |
|---|---|---|---|---|
| 5,101,448 A | * | 3/1992 | Kawachiya et al. | 382/287 |
| 5,621,819 A | * | 4/1997 | Hozumi | 382/232 |
| 6,636,635 B2 | * | 10/2003 | Matsugu | 382/218 |
| 6,665,439 B1 | * | 12/2003 | Takahashi | 382/199 |
| 6,901,171 B1 | * | 5/2005 | Dutta-Choudhury et al. | 382/266 |
| 6,993,184 B2 | * | 1/2006 | Matsugu | 382/173 |
| 2002/0003900 A1 | * | 1/2002 | Kondo | 382/199 |
| 2007/0025617 A1 | | 2/2007 | Dai et al. | |
| 2007/0086667 A1 | | 4/2007 | Dai et al. | |
| 2010/0033745 A1 | | 2/2010 | Dai et al. | |

FOREIGN PATENT DOCUMENTS

| | | |
|---|---|---|
| JP | 04-141783 A | 5/1992 |
| JP | 07-087302 A | 3/1995 |
| JP | 07-121698 A | 5/1995 |
| JP | 10-055447 A | 2/1998 |
| JP | 11-025282 A | 1/1999 |
| JP | 11-272860 A | 10/1999 |
| JP | 2003-216931 A | 7/2003 |
| JP | 2007-66070 | 3/2007 |
| JP | 2007-156841 A | 6/2007 |
| JP | 2007-183711 A | 7/2007 |

OTHER PUBLICATIONS

Japanese Office Action dated Apr. 27, 2012, in counterpart Japanese Application No. 2008-187111.

* cited by examiner

*Primary Examiner* — Jingge Wu
(74) *Attorney, Agent, or Firm* — Fitzpatrick, Cella, Harper & Scinto

(57) ABSTRACT

An image processing apparatus and method generate a vector expression by defining a direction and attribute of gradation of an image as a daub color of the vector expression for each divided contour line of a similar color region obtained from an input image, based on pixel values of plural sampling points inside each of the divided contour lines.

15 Claims, 12 Drawing Sheets

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method and a program.

2. Description of the Related Art

A conventional reproduction method of gradation is disclosed in Japanese Patent Laid-Open No. 2007-66070. In the method according to Japanese Patent Laid-Open No. 2007-66070, it is determined whether or not a gradation region is in a direction where pixels are connected for each line in a horizontal direction in a bit map image. In a case where a given condition is met, an average changing rate of the concentrations of pixels included in the region is calculated to produce a gradation expression image.

In the conventional method, as in the case of the dark and light expression inside a stroke of a handwritten character, it is not possible to detect a location where a parameter of gradation is uneven in a closed region after vectorization.

In addition, after detecting the pattern of the gradation, it is not possible to describe the gradation in vectorization.

SUMMARY OF THE INVENTION

In order to solve the foregoing problems, an image processing apparatus according to the present invention comprises a contour line obtaining unit configured to obtain a contour line of a similar color region from an input image; a feature-point setting unit configured to set a plurality of feature points based upon the contour line; a pixel-value obtaining unit configured to divide the contour line based on the feature points to obtain pixel values of plural sampling points inside each of the divided contour lines; and a generating unit configured to generate a vector expression by defining a direction and an attribute of gradation as a daub color of the vector expression for each of the divided contour lines based upon the obtained pixel values of the plural sampling points.

In regard to a character or a figure whose direction of gradations or whose light and dark gradations change unevenly, it is possible to generate the vector expression for reproducing dark and light or blur of the character or the figure.

Further features of the present invention will become apparent from the following description of exemplary embodiments (with reference to the attached drawings).

DESCRIPTION OF THE EMBODIMENTS

First Embodiment

Hereinafter, the present invention will be in detail explained with reference to the drawings.

Figure 1:
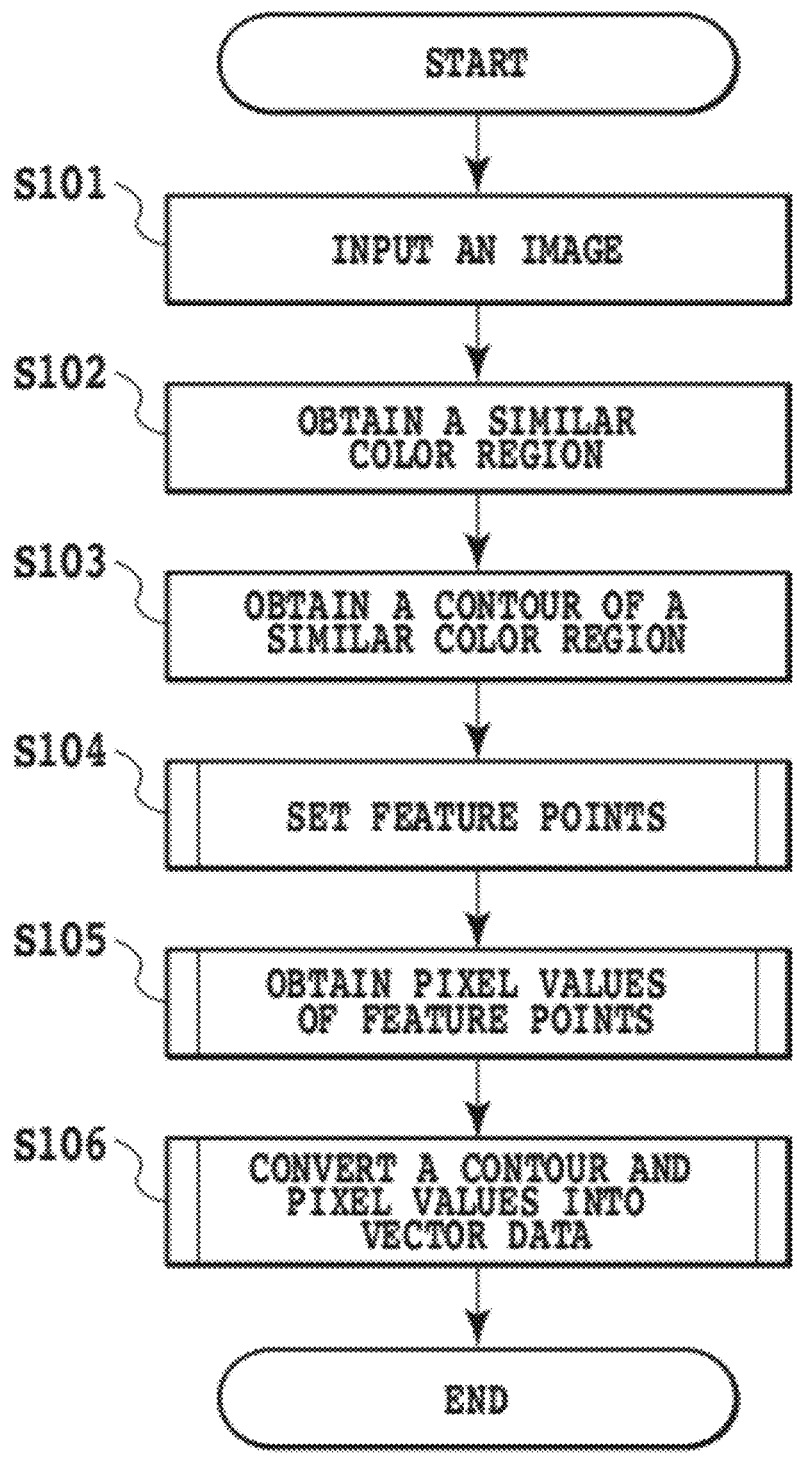
FIG. 1 is a flow chart showing the process of a gradation detection and a vectorization description in a handwritten character region.

FIG. 1 is a flow chart showing the processing of a gradation detection and a vectorization description in a handwritten character region in an input image according to the first embodiment.

Figure 6:
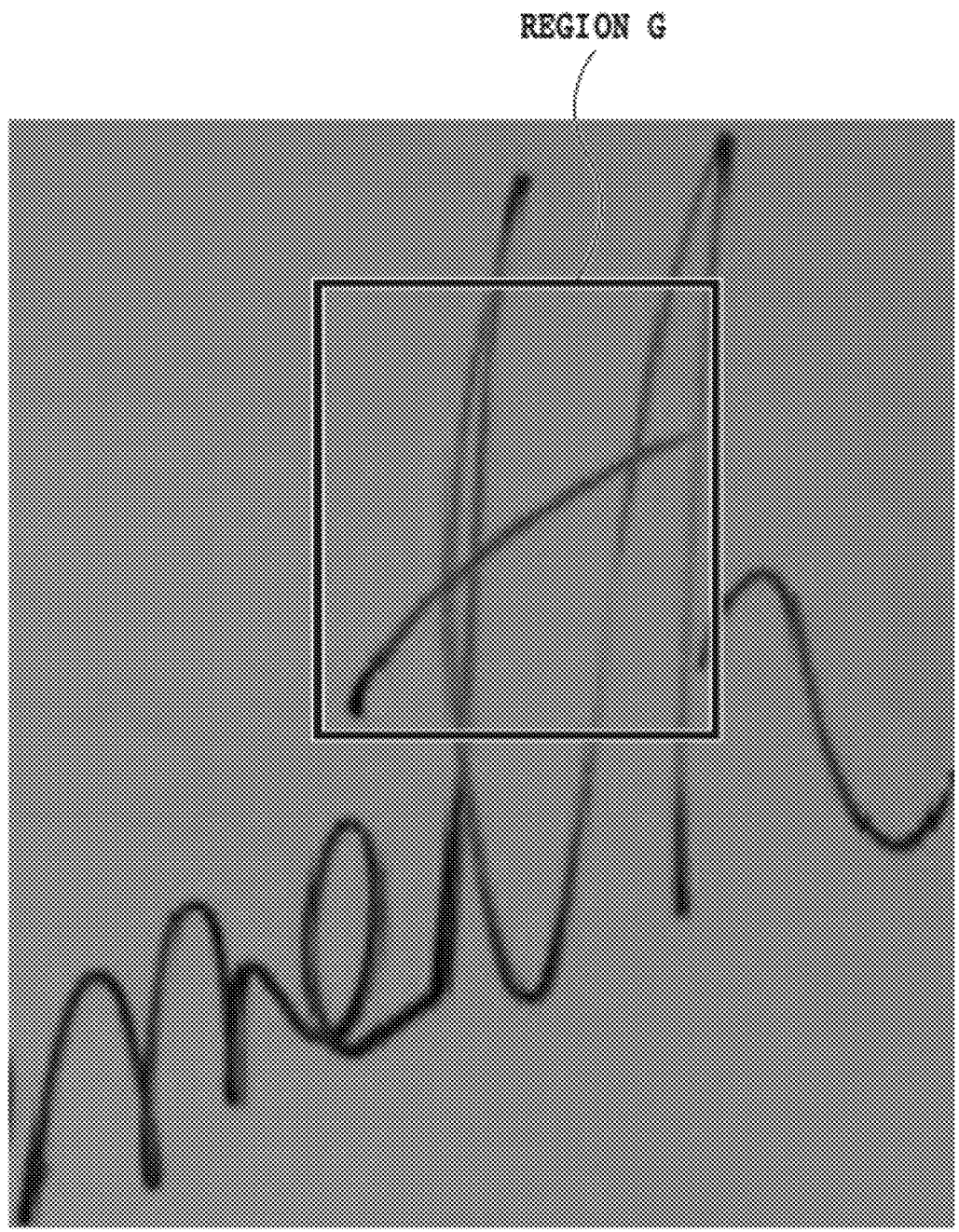
FIG. 6 is a diagram showing an input image.

FIG. 6 is an image obtained by photographing a white board on which a character is written by hand writing with a digital camera.

In an image processing apparatus according to the first embodiment, an image as shown in FIG. 6 is used as an input image to perform a gradation detection operation and a vectorization description in a handwritten character region.

Figure 9:
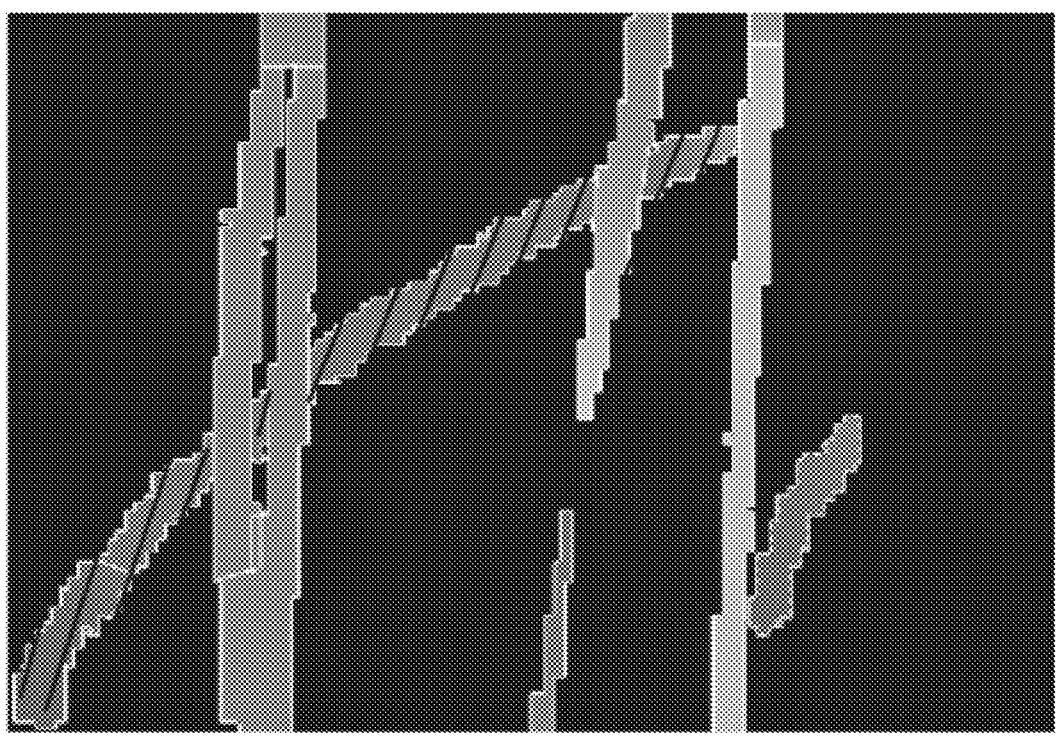
FIG. 9 is a diagram showing a gradation detection result image.

The result of the gradation detection obtained from the first embodiment is shown in FIG. 9. FIG. 9 is an enlarged diagram of a portion corresponding to a region G of the input image shown in FIG. 6. From the result of the gradation detection, it is possible to obtain an image in which pixels values change smoothly in a region having strong and weak strokes of the handwritten character. In FIG. 9, in portions having the strong and weak strokes, the pixel values are estimated to change smoothly along the strong and weak portions.

Hereinafter, the content of the processing in FIG. 1 will be explained. It should be noted that the processing shown in FIG. 1 is executed by a CPU in the image processing apparatus according to the present embodiment.

First, at step S101 in FIG. 1, input of an image is made.

Figure 7:
FIG. 7 is a diagram showing a similar color region image.

Next, regions in which colors are similar to each other are collectively obtained as a similar color region at step S102. Upon obtaining the similar color region, when a pixel has a color similar to that of a nearby pixel (for example, neighboring pixel), these regions are collected as the same similar color region. Therefore, regions subject to gradation are collected as one region. FIG. 7 shows the result of the process at step S102. As understood from FIG. 7, by collecting regions where colors are similar to each other, a handwritten character region and a background region can be separated from the input image.

Figure 8:
FIG. 8 is a diagram showing a contour extraction image.

Next, at step S103 in FIG. 1, from the similar color region obtained at step S102, a contour of the similar color region is obtained. FIG. 8 shows the result of the process at step S103. As shown in FIG. 8, at step S103, the contour of the similar color region obtained at step S102 is extracted.

Next, at step S104 in FIG. 1, the contour obtained at step S103 is used to set feature points. A detail of the process at step S104 will be described later with reference to FIG. 2.

Next, at step S105 in FIG. 1, in regard to the feature points set at step S104, a pixel value of each feature point is obtained. A detail of the process at step S105 will be described later with reference to FIG. 3.

Next, at step S106 in FIG. 1, the contour obtained at step S103 and the pixel value of each feature point obtained at step S105 are used to generate vector data.

Figure 2:
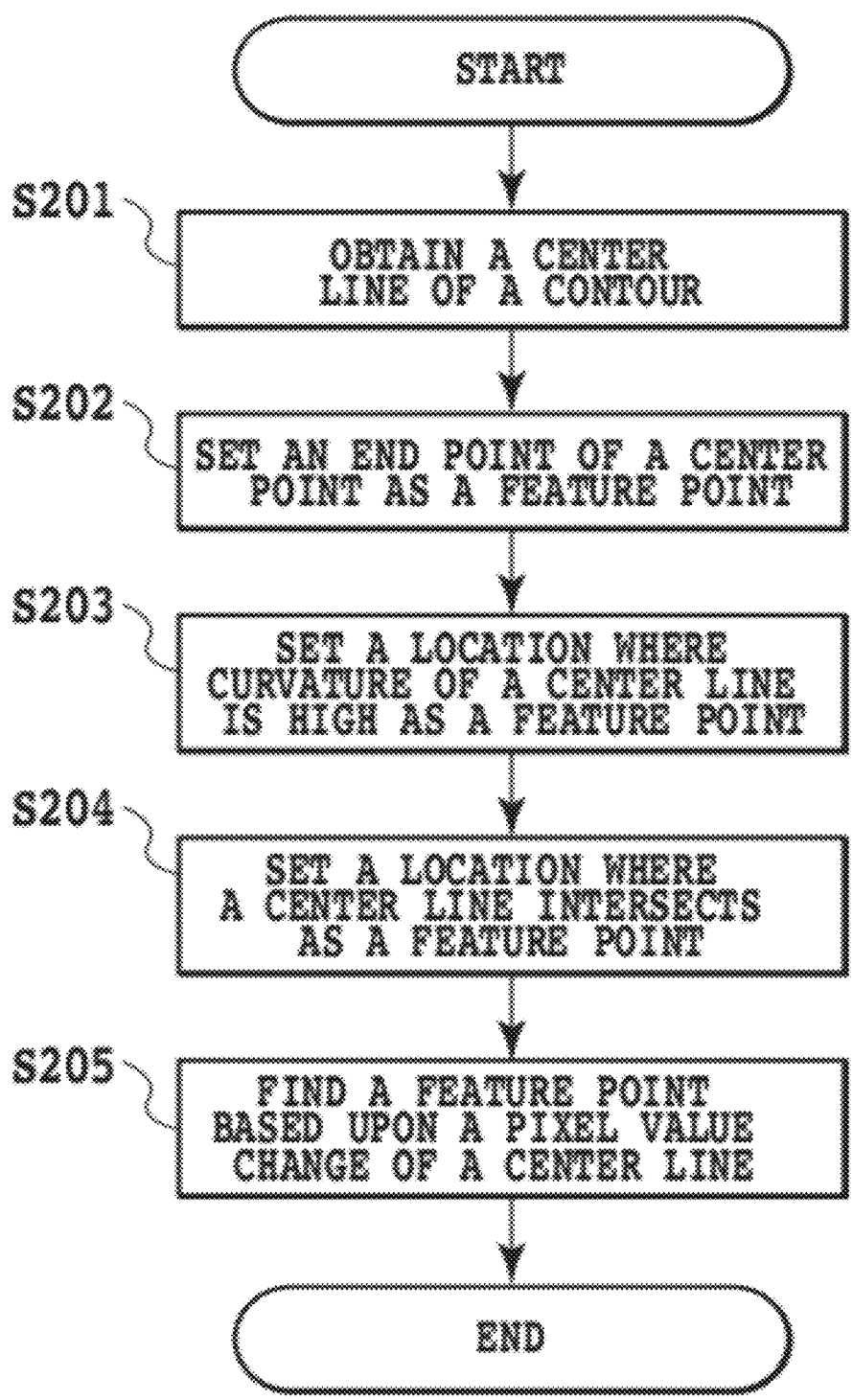
FIG. 2 is a flow chart showing the process of setting feature points.

FIG. 2 shows the details of the process of setting the feature points at step S104 in FIG. 1. It should be noted that the processing shown in FIG. 2 is executed by the CPU in the image processing apparatus according to the present embodiment.

Figure 10:
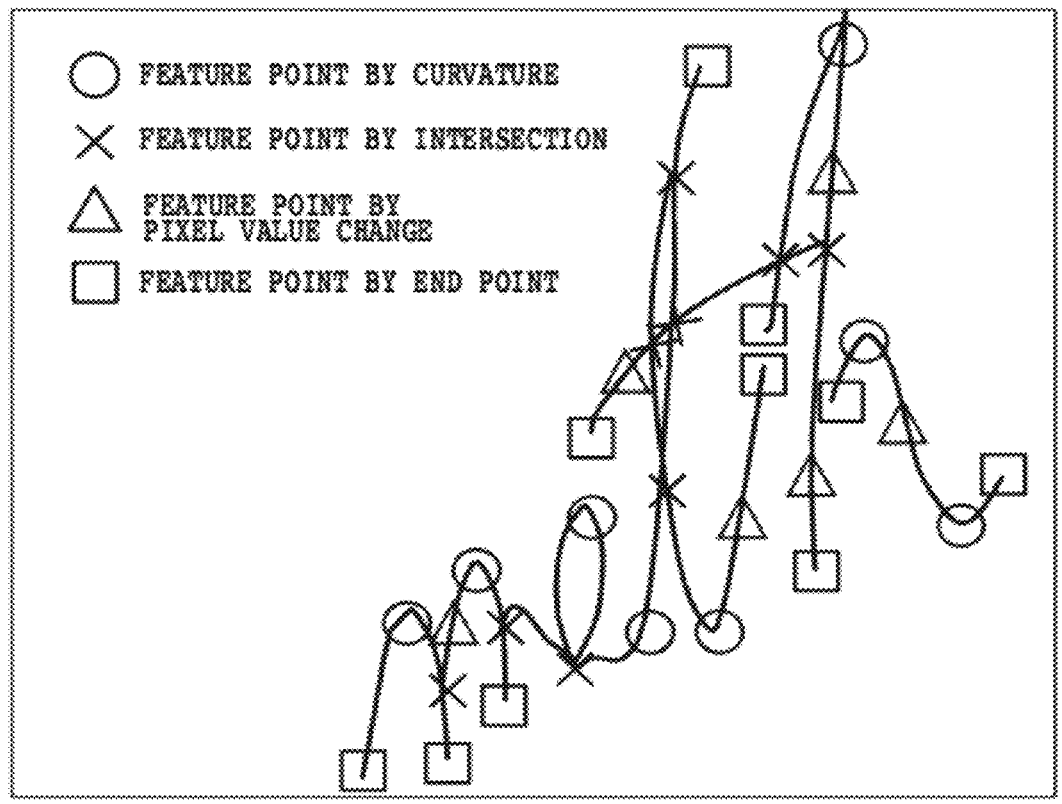
FIG. 10 is a diagram showing a feature-point setting image.

In addition, FIG. 10 shows an example of setting specific feature points. Here, the process flow in FIG. 2 will be explained with reference to a specific example of the feature points in FIG. 10.

First, at step S201 in FIG. 2, a center line of the contour is obtained. Here, the center line refers to a representative line passing through a region surrounded by the contour. In the first embodiment, the center line is a line found by thinning The thinning processing can be executed by using a well-known technology, and by the thinning processing, information of the center line and the line width can be obtained based upon the contour.

Any of steps S202 to S205 which will be hereinafter explained relates to the setting of the feature points, and all the feature points are set on the center line obtained at step S201.

At step S202, end points of the center line found at step S201 are set as feature points. In an example in FIG. 10, positions set as the feature points are the locations of the end points and are denoted by a square symbol (□) in FIG. 10.

Next, at step S203, locations where a curvature of the center line is high are set as the feature points.

In FIG. 10, regions set to the feature points as the locations where the curvature is high are denoted by a circle symbol (○).

Next, at step S204, locations where the center line intersects are set as the feature points.

In FIG. 10, regions set to the feature points as the locations where the center line intersects are denoted by an x symbol (x).

Next, at step S205, feature points are found based upon locations where a change of the pixel value in the center line rapidly changes.

In FIG. 10, locations set to the feature points based upon the change of the pixel value are denoted by a triangular symbol (Δ).

Hereinafter, an example of a method of setting feature points based upon the change of the pixel value will be explained with reference to FIG. 11.

Figure 11:
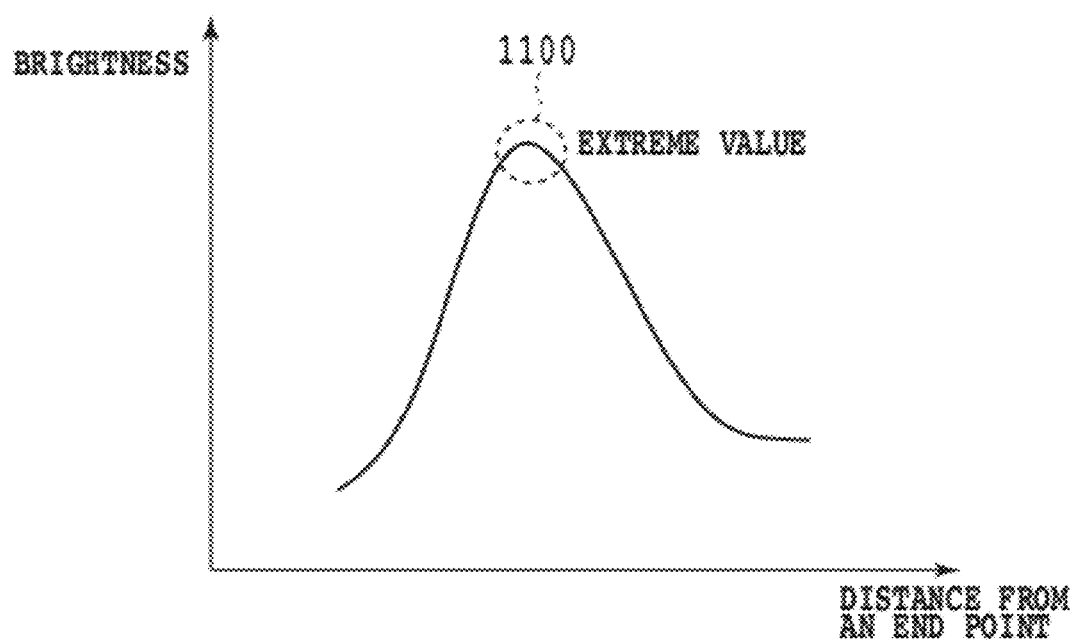
FIG. 11 is a diagram explaining the setting of a feature point based upon a change of a pixel value.

FIG. 11 is an example of a graph where a vertical axis represents brightness and a lateral axis represents a distance along the center line from an end point. The above end point refers to an end point of the center line, and the location where the brightness rapidly changes is set as the feature point. The rapid change of the brightness is found by detecting a location having more than a threshold value at the time of calculating a second differential of the graph shown in FIG. 11 or a location where the graph has an extreme value 1100.

Figure 3:
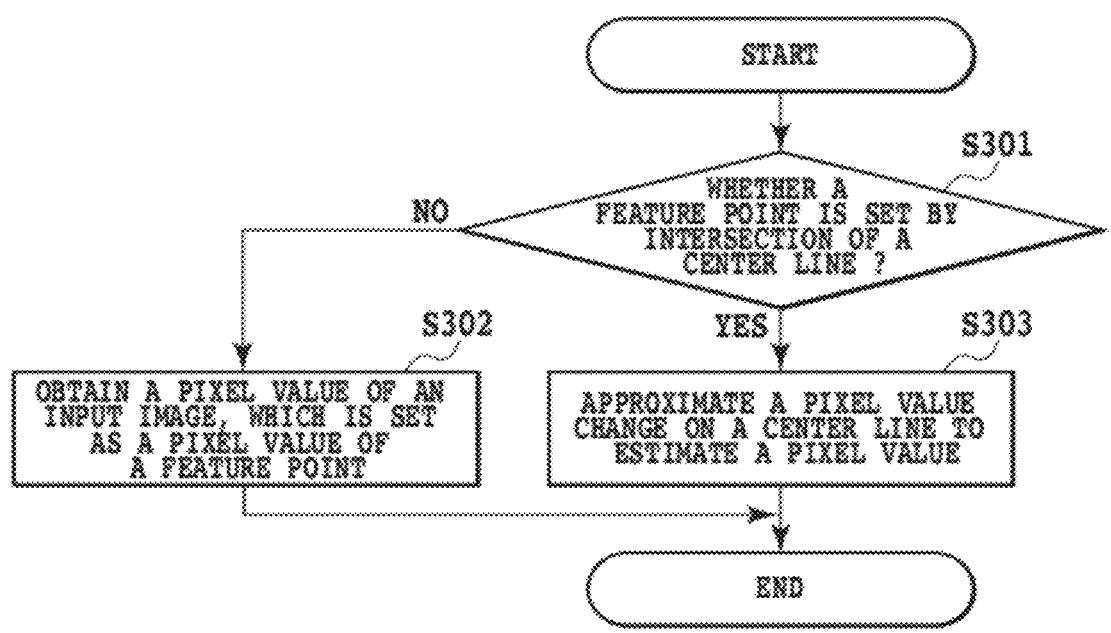
FIG. 3 is a flow chart showing the process of obtaining pixel values in the feature points.

FIG. 3 shows a detail of the processing of obtaining pixel values in the feature points at step S105 in FIG. 1. It should be noted that the processing shown in FIG. 3 is executed by the CPU in the image processing apparatus according to the present embodiment.

Upon obtaining pixel values of feature points, in a case of a feature point of a location where the center line does not intersect, a pixel value of the corresponding position in an input image is obtained. In a case of a feature point of a location where the center line intersects, mostly the pixel value of the intersection point becomes a dark color. Therefore, it is not desirable to use the pixel value at the corresponding position in the input image as it is. Therefore, the present invention is configured to obtain a pixel value at a neighboring position along each center line.

First, at step S301 in FIG. 3, it is determined whether or not the feature point is the feature of the location where the center line set by step S204 intersects.

At step S301, in a case where it is determined that the feature point is the feature of the location where the center line set by step S204 intersects, the process goes to step S303.

On the other hand, at step S301, in a case where it is determined that the feature point is not the feature point of the location where the center line set by step S204 intersects, the process goes to step S302.

At step S302, a pixel value of the input image corresponding to the position of the feature point is obtained, which is set as the pixel value of the feature point.

At step S303, the pixel value of the feature point is estimated and found so that the pixel value on the center line including the feature point continuously changes. For example, in a case where two lines intersect, since 3 or 4 lines are supposed to extend from the intersection position, pixel values are found in each direction. That is, a few neighboring pixel values in each direction along the center line are obtained, which are set as the pixel values in each direction. In addition, a pixel value in a position corresponding to the intersection position in the input image is also obtained In consequence, in the present embodiment, the pixel value in the input image corresponding to the intersection position and three or four pixel values neighboring in each direction where the center lines extend from the intersection position can be obtained.

Figure 4:
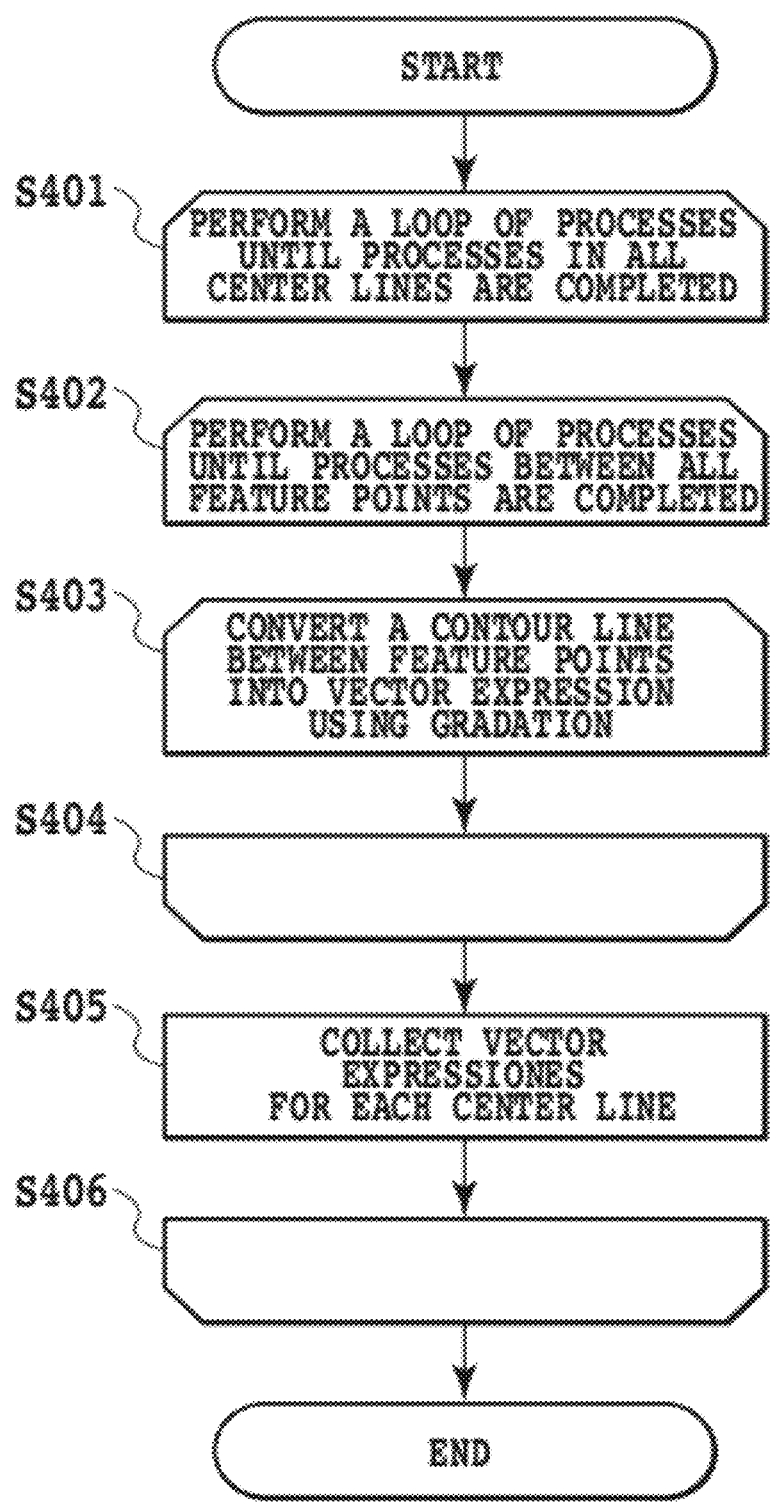
FIG. 4 is a flow chart showing the process of converting a contour and gradation into vector data.

FIG. 4 is a diagram explaining a detail of the process at step S106 in FIG. 1. It should be noted that the processing shown in FIG. 4 is executed by the CPU in the image processing apparatus according to the present embodiment.

First, step S401 in FIG. 4 is a loop end for repeating the processes from steps S402 to S405 until the processes in regard to all the center lines are completed. At step S401, one of incomplete center lines is set as the process object, and the process goes to step S402.

Step S402 is a loop end for repeating the process of step S403 until the processes between all the feature points are completed. At step S402, one of incomplete processes between the feature points is set as the process object, and the process goes to step S403. It should be noted that here, "between feature points" means between two neighboring feature points connected by the center line.

At step S403, the process of describing in a vector expression the gradation between feature points is executed between the neighboring feature points. A detail of the process will be described later with reference to FIG. 5.

Step S404 is a terminal of a loop end of step S402.

At step S405, in regard to one center line set as the processing object, the vector expressions between the plural feature points obtained by the processes of steps S402 to S404 are enumerated as the vector expression representing the one center line. That is, since one center line is separated into plural vector expressions each one of which is set for each line between the feature points, for handling these vector expressions as an object connected by one center line, the processing of collecting these vector expressions per object unit is executed. For example, in a case of performing XML notation, a tag representing the object is defined and the vector notations per line unit between the feature points are collectively described for each center line (that is, for each object such as character or word).

Step S406 is a terminal of a loop end of step S401, and when the processes of steps S402 to S405 in all the center lines are completed, the loop process is completed.

Figure 5:
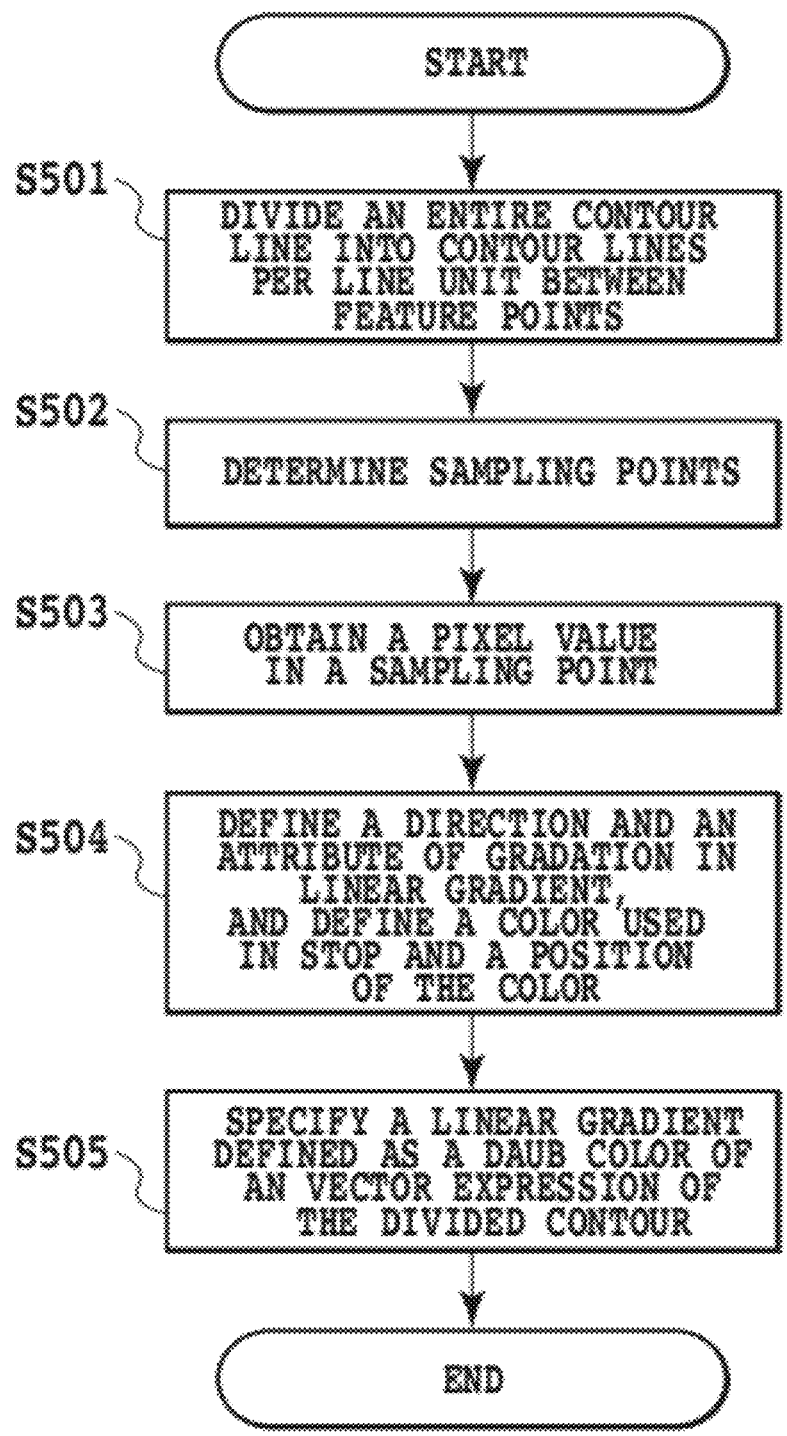
FIG. 5 is a flow chart showing the process of describing in vector terms a center line as a single stroke.

FIG. 5 is a diagram explaining a detail of the process at step S403 in FIG. 4. It should be noted that the processing shown in FIG. 5 is executed by the CPU in the image processing apparatus according to the present embodiment.

Figure 12:
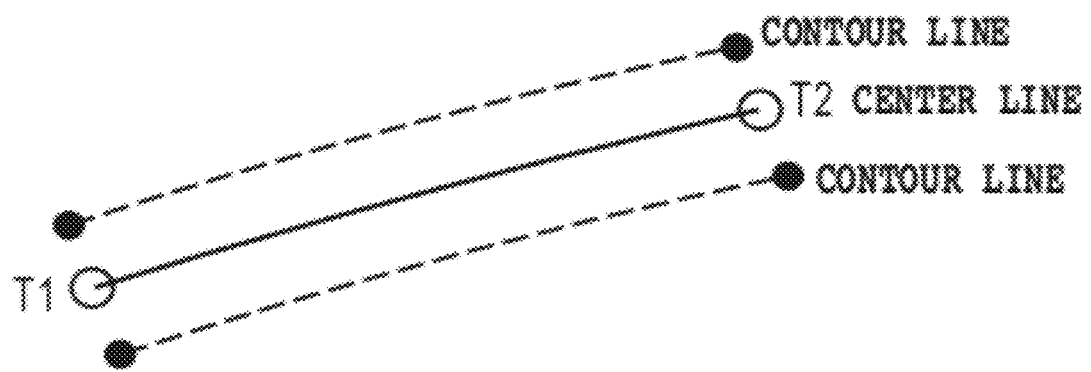
FIG. 12 is a diagram explaining a calculation method of a ratio in a distance from a circumscribing rectangle to a feature point.

First, at step S501 in FIG. 5, the contour line obtained at step S103 in FIG. 1 is divided by two feature points which are set as the process object at step S403 to obtain contour lines between the two feature points. FIG. 12 shows the center line between the feature points T1 and T2 and the contour lines divided by the two feature points. It should be noted that the division processing of the contour line is executed so that the entire contour line is divided using a linear line extending in a direction perpendicular to the center line from the feature point as a division line, making it possible to obtain a contour per a two-feature point unit (contour of a region surrounded by the division lines and the contour lines).

At step S502, plural sampling points are set inside the contour lines. For example, in the present embodiment, the feature points on the center line (white circle points in FIG. 12) are set as the sampling points, and further, points on the contour lines (for example, black circle points in FIG. 12) or intermediate points thereof may be set as the sampling point. The intermediate point may be set in plurality, such as intermediate points between two feature points and on the contour line. When too many intermediate points are set, it takes time to perform approximation of gradation. Therefore, it is preferable to set the order of 2 to 12 locations as the sampling points.

At step S503, a pixel value of each sampling point is obtained. However, as the pixel value of the feature point by intersection, the pixel value in the direction of the line between the feature points found at step S303 in FIG. 3 is used.

An approximation is made by linear gradation based upon the pixel value in each sampling point at step S504. That is, in a case of the expression by using a SVG method, a tag of a linear gradient is used to define a direction and an attribute of the gradation. The inclination and the direction of the gradation can be specified by specifying start coordinates and end coordinates. Further, a color used in a stop tag is expressed by a stop-color attribute, and a position of the color is defined by an offset attribute.

At step S505, the contour line corresponding to the line between the feature points obtained at step S501 is converted into a vector expression. In the present embodiment, the contour line is converted into the vector expression by approximation with the center line between the feature points and the line width, but the contour line itself may be approximated. In addition, as the daub color of the vector expression, the linear gradient defined at step S504 is specified.

By thus executing the processing in FIG. 5, the gradation between the feature points can be converted into the vector expression. The vector expression of the gradation between the feature points produced in this way is collected for each object at step S405 in FIG. 4. It should be noted that the feature point by the intersection mostly becomes a color produced by the mixing of plural strokes (for example, dark color). Therefore, it is preferable that the pixel value of the feature point in the intersection is expressed by the pixel value obtained from the input image.

By the processing as described above, the contour is obtained from the input image, and an inside of the contour can be described in gradation. In the present embodiment, an image obtained by photographing a handwritten character on a white board by a digital camera is set as an input image, as one example, but the input image is not limited thereto and an image obtained by scanning a handwritten character or a handwritten figure described on a paper may be set as an input image. In addition, the present invention is not limited to handwritten characters or figures, but can be applied to characters or figures subject to gradation.

Other Embodiment

The present invention may be applied to a system configured of plural units (for example, a computer, an interface unit, a reader, a printer and the like) or to a device configured of one unit (for example, a complex machine, a printer, a facsimile device or the like).

An object of the present invention is achieved by reading out and performing a program code from a storage medium which has stored the program code achieving the procedure of the flow chart shown in the aforementioned embodiment, by a computer (or CPU or MPU) in a system or a device. In this case, the program code itself read out from the storage medium achieves the function of the aforementioned embodiment. Therefore, each of the program code and the computer readable storage medium storing/printing the program code also constitutes an embodiment of the present invention.

Examples of the storage medium for supplying the program code may include, a floppy (trade mark) disc, a hard disc, an optical disc, an optical magnetic disc, a CD-ROM, a CD-R, a magnetic tape, a non-volatile memory card, and a ROM.

The function of the aforementioned embodiment is realized by executing the program read out by the computer. Besides, the execution of the program includes also a case where an operating system (OS) working on a computer executes a part or all of the actual processing based upon an instruction of the program.

Further, the function of the aforementioned embodiment can be realized also by a function expansion board inserted into a computer or by a function expansion unit connected to a computer. In this case, the program read out from the storage medium is written in a memory in the function expansion board inserted into the computer or in the function expansion unit connected to the computer. Thereafter, the CPU equipped in the function expansion board or in the function expansion unit executes a part or all of the actual processing based upon an instruction of the program. The function of the aforementioned embodiment is realized also by the processing of the function expansion board or the function expansion unit.

Each step of the flow chart in the aforementioned embodiment is not only achieved by use of the software (computer), but also may be achieved by use of hardware (electronic circuit).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-187111, filed Jul. 18, 2008, which is hereby incorporated by reference herein in its entirety.

What is claimed is:

1. An image processing apparatus comprising:
a contour line obtaining unit configured to obtain a contour line of a similar color region from an input image;
a feature-point setting unit configured to set a plurality of feature points based upon the contour line;
a pixel-value obtaining unit configured to divide the contour line to produce divided contour lines based on the set feature points to obtain pixel values of plural sampling points inside each of the divided contour lines; and a generating unit configured to generate a vector expression by defining a direction and an attribute of gradation as a daub color of the vector expression for each of the divided contour lines based upon the obtained pixel values of the plural sampling points.

2. An image processing apparatus according to claim 1, wherein the feature-point setting unit obtains a center line of the contour line and sets the feature points based upon the center line.

3. An image processing apparatus according to claim 2, wherein the feature-point setting unit sets an end point of the center line, a point of the center line with curvature, a point where the center line intersects itself, and a point where there is a change in a pixel value of the center line, as the feature points.

4. An image processing apparatus according to claim 1, wherein a pixel value obtained by the pixel-value obtaining unit includes a pixel value of one of the feature points.

5. An image processing apparatus according to claim 1, wherein pixel values obtained by the pixel-value obtaining unit further include pixel values of plural sampling points on the divided contour lines or inside the divided contour lines.

6. An image processing apparatus according to claim 1, wherein in a case where one of the feature points is a point where a center line of the contour line intersects itself, the pixel-value obtaining unit obtains a pixel value based upon a pixel value at a position neighboring the point where the center line intersects itself.

7. An image processing apparatus according to claim 1, wherein the generating unit generates the vector expression by collecting vector expressions of the divided contour lines in an object unit.

8. An image processing method comprising:
a contour line obtaining step of obtaining a contour line of a similar color region from an input image;
a feature-point setting step of setting a plurality of feature points based upon the contour line;
a pixel-value obtaining step of dividing the contour line to produce divided contour lines based on the set feature points to obtain pixel values of plural sampling points inside each of the divided contour line; and
a generating step of generating a vector expression by defining a direction and an attribute of gradation as a daub color of the vector expression for each of the divided contour lines based upon the obtained pixel values of the plural sampling points.

9. An image processing method according to claim 8, wherein the feature-point setting step obtains a center line of the contour line and sets the feature points based upon the center line.

10. An image processing method according to claim 9, wherein the feature-point setting step sets an end point of the center line, a point of the center line with a curvature, a point where the center line intersects itself, and a point where there is a change in a pixel value of the center line, as the feature points.

11. An image processing method according to claim 8, wherein a pixel value obtained by the pixel-value obtaining step includes a pixel value of one of the feature points.

12. An image processing method according to claim 8, wherein pixel values obtained by the pixel-value obtaining step further include pixel values of plural sampling points on the divided contour lines or inside the divided contour lines.

13. An image processing method according to claim 8, wherein in a case where one of the feature points is a point where a center line of the contour line intersects itself, the pixel-value obtaining step obtains a pixel value based upon a pixel value at a position neighboring the point where the center line intersects itself.

14. An image processing method according to claim 8, wherein the generating step generates the vector expression by collecting vector expressions of the divided contour lines in an object unit.

15. A non-transitory computer readable storage medium storing a program for executing an image processing method by a computer, the image processing method comprising:
a contour line obtaining step of obtaining a contour line of a similar color region from an input image;
a feature-point setting step of setting a plurality of feature points based upon the contour line;
a pixel-value obtaining step of dividing the contour line to produce divided contour lines based on the set feature points to obtain pixel values of plural sampling points inside each of the divided contour line; and
a generating step of generating a vector expression by defining a direction and an attribute of gradation as a daub color of the vector expression for each of the divided contour lines based upon the obtained pixel values of the plural sampling points.

* * * * *